Figures 1, 2:
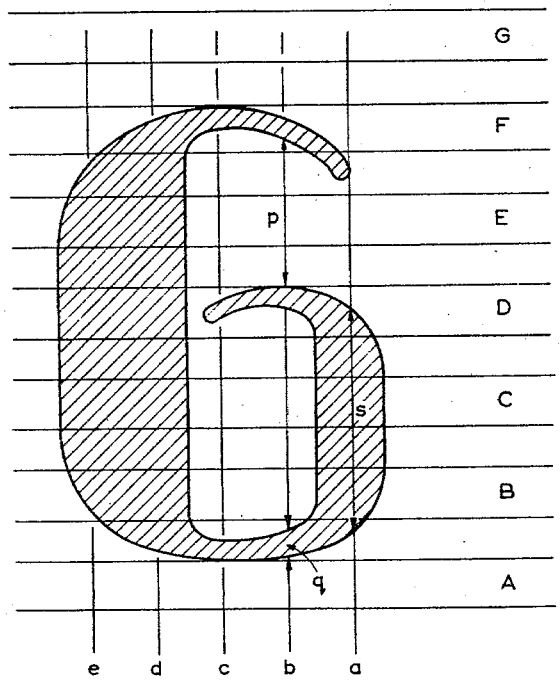

May 25, 1965  W. E. INGHAM  3,185,962

READING OF CHARACTERS

Filed Aug. 20, 1959  7 Sheets-Sheet 1

Inventor
W. E. Ingham
By Hancock Downing Seebold
Attys.

May 25, 1965  W. E. INGHAM  3,185,962
READING OF CHARACTERS
Filed Aug. 20, 1959  7 Sheets-Sheet 4

Inventor
W. E. Ingham
By Glascock Downing Newhall
Attys.

May 25, 1965  W. E. INGHAM  3,185,962

READING OF CHARACTERS

Filed Aug. 20, 1959  7 Sheets-Sheet 6

Inventor
W. E. Ingham

United States Patent Office 3,185,962
Patented May 25, 1965

3,185,962
READING OF CHARACTERS
William Ellis Ingham, Ealing, London, England, assignor to Electric & Musical Industries Limited, Hayes, Middlesex, England, a company of Great Britain
Filed Aug. 20, 1959, Ser. No. 835,088
Claims priority, application Great Britain, Aug. 23, 1958, 27,126/58
11 Claims. (Cl. 340—146.3)

This invention relates to the reading of characters and especially but not exclusively to reading of characters which are recognisably similar to characters normally used on printed or typewritten documents.

It has previously been proposed to read characters by analysing the characters in a series of strips extending from one edge thereof to another and to derive the mark-to-space ratio of the successive strips. The character is then identified in dependence upon the combination of the mark-to-space ratios corresponding to the successive strips.

For the purpose of identifying characters by the above means the characters may be printed with magnetic ink and a magnetic reading head is employed for detecting the mark-to-space ratios of the successive strips into which the character is divided. For the purpose of detecting the mark-to-space ratios the magnetic material of the ink is first magnetised for example by passing the document beneath a recording head carrying an alternating current, after which the characters are passed beneath a reading head which produces an output representative of the area of the magnetic material of each strip of a character. Alternatively, the magnetic material may be magnetised by a D.C. field, in which case the output signal obtained from the reading head is normally the differential of that obtained when the magnetic material is subjected to an A.C. field. Again, the presence of unmagnetised material may be detected by the effect on the reluctance of the head.

It has been found in practice that magnetic character reading apparatus employing the above proposals with the output waveform derived from a magnetic reading head is liable to be distorted as a result of variations in the thickness of the magnetic ink and also as a result of surface irregularities which tend to produce small air gaps between the magnetic ink and the reading head. The resulting spurious signal fluctuations may be sufficient to render the interpretation of the reproduced signals inaccurate.

The object of the present invention is to provide an improved method and apparatus for reading characters in which disadvantages due to spurious signal fluctuations are removed or at least substantially reduced.

According to the present invention there is provided apparatus for reading printed characters comprising means for analysing a character to produce a plurality of groups of discrete signals characteristic of the character, the number of kinds of said discrete signals being less than the number of said signals, means for producing for each group of said first discrete signals a further discrete signal of one kind if one particular criterion is satisfied by the respective group of first discrete signals and a further signal of another kind if that criterion is not so satisfied, and means responsive to the combination of said further discrete signals for identifying the character.

Preferably characters are printed with magnetic ink and the reading means is a magnetic sensing head.

According to a feature of the invention moreover, the magnetic sensing head is subdivided into elements, the arrangement being such as to make it necessary to detect only the presence or absence of a signal above a predetermined level at two adjacent elements thereby to give a signal pattern of binary form for each strip of a character.

Figure 3:
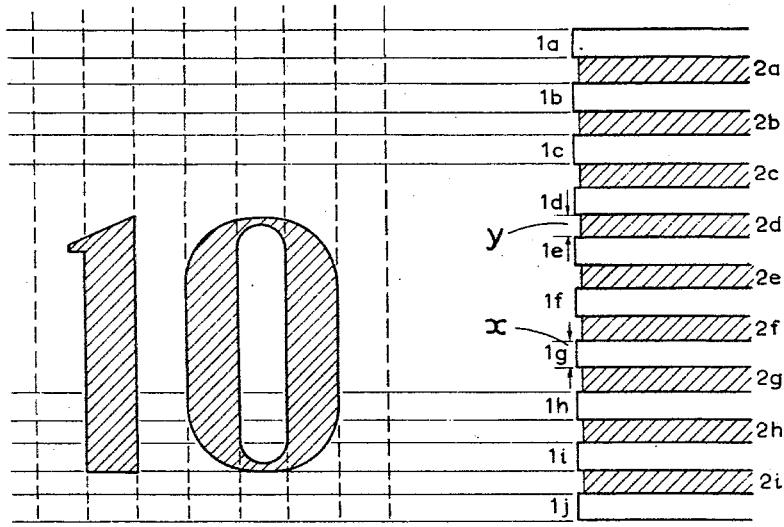
Figure 4:
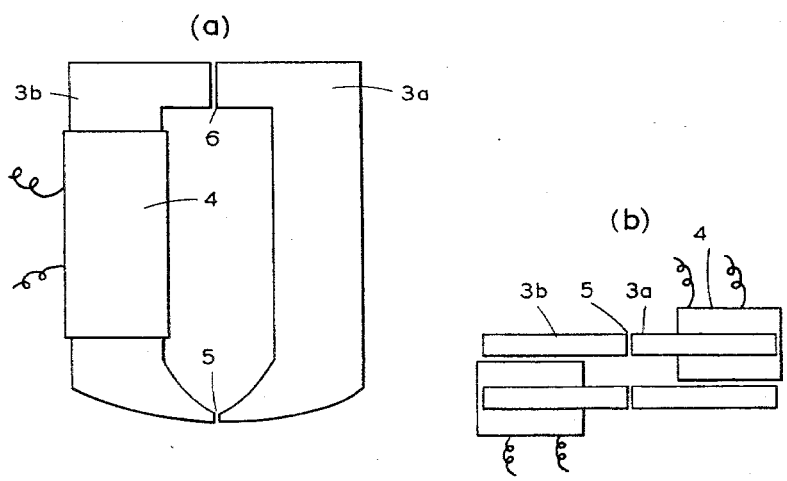
Figure 5:
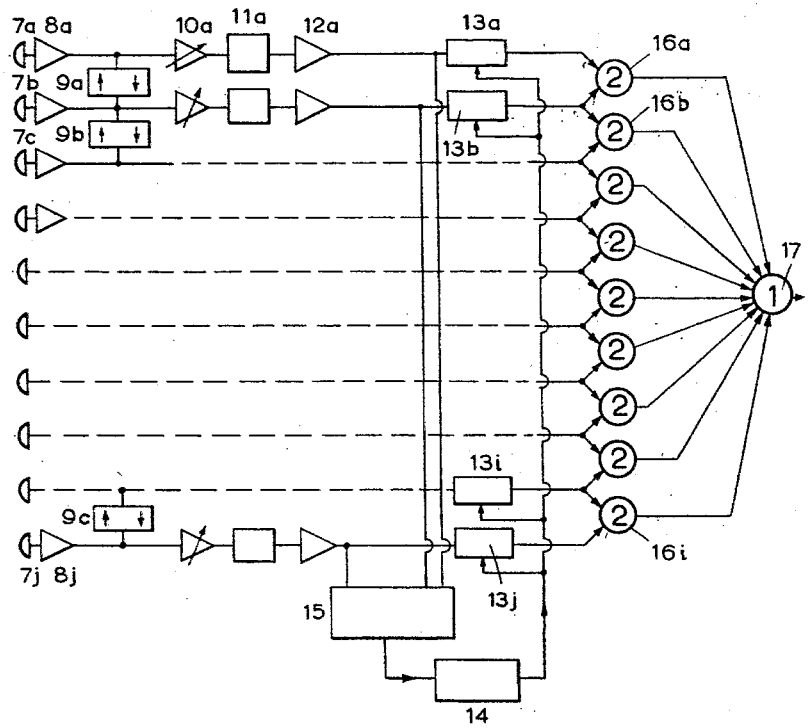
Figure 6:
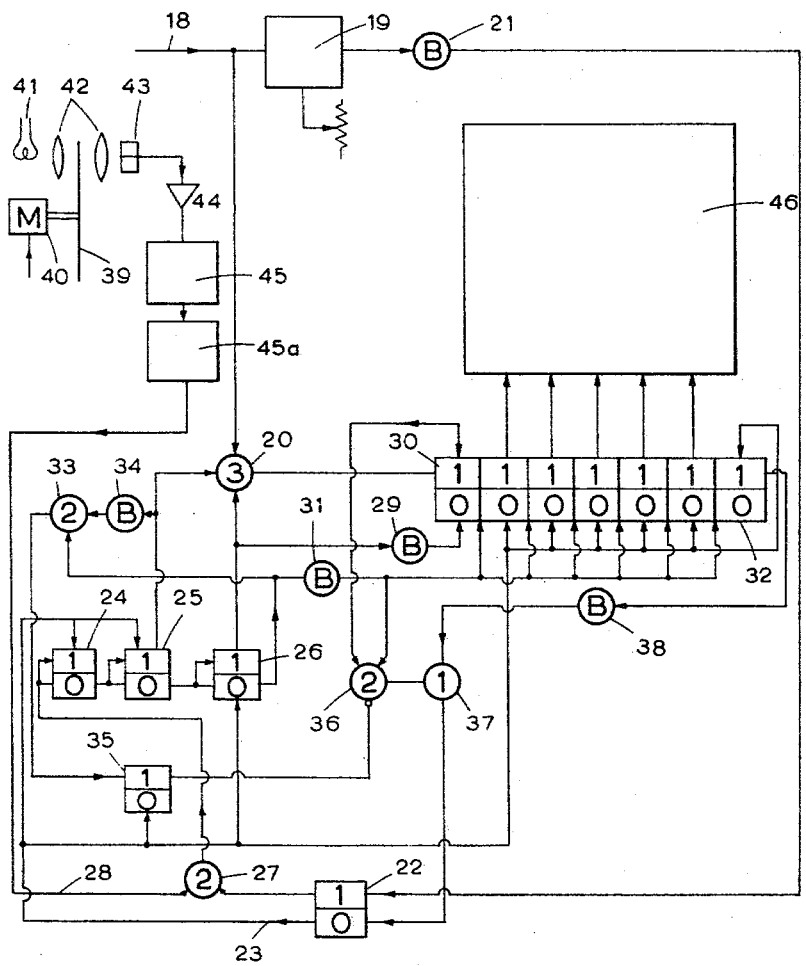
Figure 7:
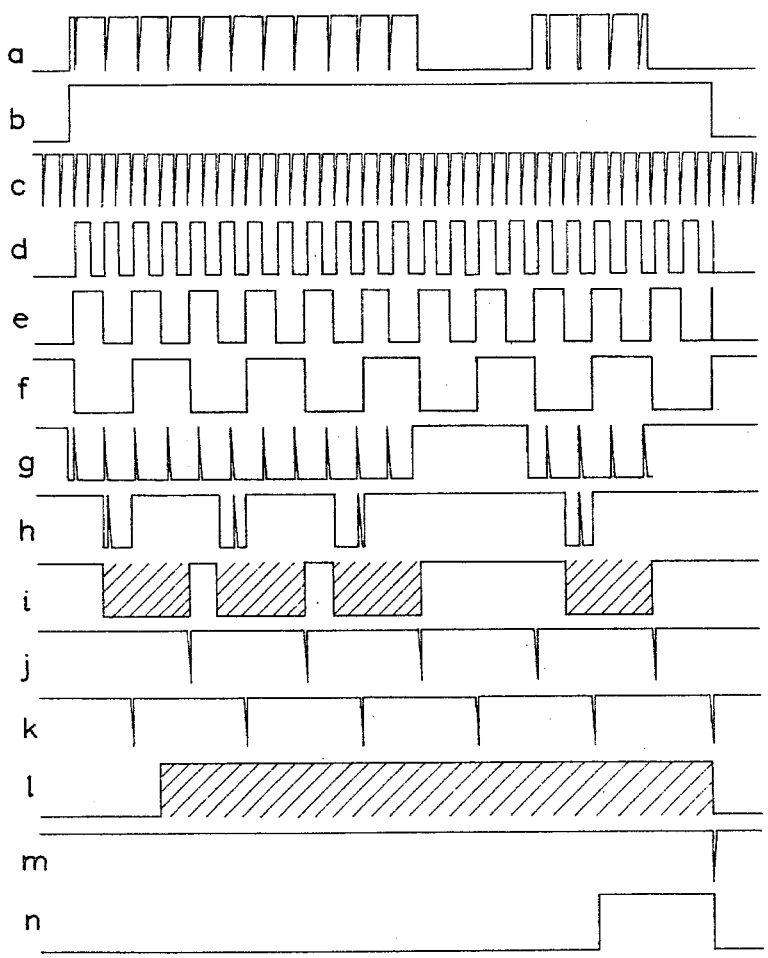
Figure 8:
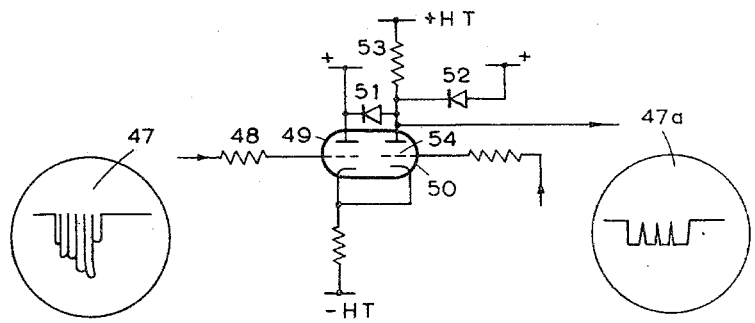
Figure 9:
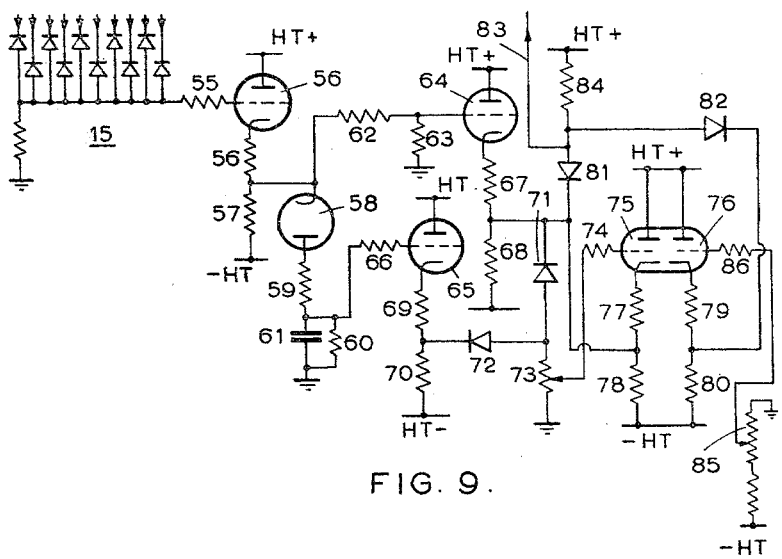
Figure 10:
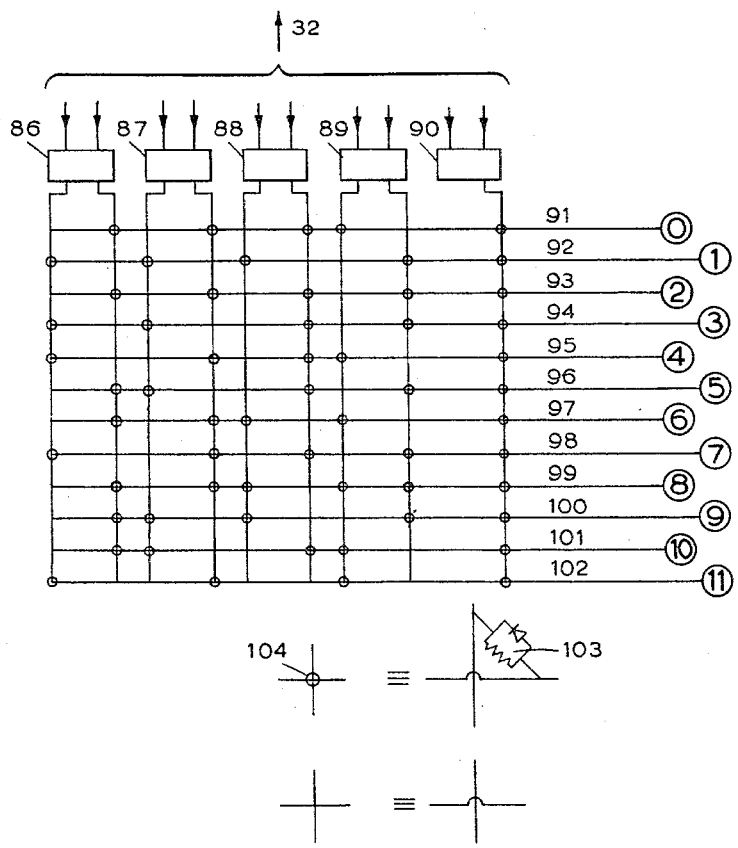

In order that the present invention may be clearly understood and readily carried into effect the invention will be further described with reference to the accompanying drawings, in which:

FIGURE 1 illustrates a type face suitable for use with the present invention,

FIGURE 2 illustrates a set of numerical type faces for use with the present invention, FIGURE 3 illustrates the relationship of a magnetic reading head with a printed character according to the invention, FIGURE 4 illustrates in diagrammatical form construction of a magnetic reading head for use with apparatus according to the invention, FIGURE 5 illustrates in schematic form a part of one embodiment of a circuit arrangement according to the invention, being that part which produces a further signal in response to adjacent elements of a strip of a character, FIGURE 6 illustrates also in schematic form the remainder of the embodiment of the present invention to be taken along with FIGURE 5, FIGURE 7 illustrates in graphical form a timing diagram for the circuit arrangement according to FIGURES 5 and 6, FIGURE 8 shows a double limiting circuit for use in the arrangement of FIGURE 5, FIGURE 9 shows a limiting level threshold circuit suitable for use with the limiting circuit of FIGURE 8, and FIGURE 10 illustrates in diagrammatical form a decoding matrix for decoding the characters illustrated in FIGURE 2, for use in the arrangement of FIGURES 5 and 6.

Referring to FIGURE 1, this figure illustrates the character "6" in a form suitable to be read by a method in accordance with the present invention. The hatched area represents the magnetic ink forming the character and this particular character may be identified in a binary code as 10011. According to the embodiment of the invention to be described it is proposed that a strip of the character can be identified by one kind of binary digit such as a "1" if any two adjacent elements in the strip produce outputs exceeding a predetermined level and otherwise the strip is identified by the other binary digit namely a "0." Thus if as shown in FIGURE 1, the character "6" is analysed by a reading head sub-divided into a number of heads A, B, C, D, E, F, G and the positions on the characters at which sensing occurs are indicated by the vertical lines $a, b, c, d, e$, significant outputs will be produced at instant ($a$) by the heads B, C and D but not from the heads A, B, F or G so that in accordance with the preferred embodiment of the invention the strip $a$ is identified by the digit "1." On the other hand the strip $b$ gives rise to outputs from heads D, and F only and is identified by the digit "0."

A set of numerical type face characters suitable for use with the invention is shown in FIGURE 2, the characters 10 and 11 being included if required to indicate shillings and pence, and the following table sets out the appropriate coding for each character.

| Character: | Code |
|---|---|
| 1 | 11000 |
| 2 | 11111 |
| 3 | 11100 |
| 4 | 10110 |
| 5 | 11101 |
| 6 | 10011 |
| 7 | 11110 |

| Character: | Code |
|---|---|
| 8 | 11011 |
| 9 | 11001 |
| 0 | 10111 |
| 10 | 10101 |
| 11 | 10010 |

Clearly other forms of coding may equally well be employed and further characters can also be included.

By arranging the size of the characters in relation to the sub-divided reading head or vice versa so that the characters fall well within the area scanned by the reading head difficulties which are otherwise liable to be introduced as a result of the slight mislocation of a character relatively to a reading head, are overcome. Thus in FIGURE 3 the width of a magnetic head is shown in relationship to the height of the character 10. The magnetic reading head comprises ten laminated magnetic cores $1a$, $1b$, $1c$ . . . $1j$ separated by non-magnetic spacers $2a$, $2b$ . . . $2i$. The spacers are of thickness $y$, the magnetic cores are of thickness $x$ and the character is only covered by five of the reading elements made up by a single core and a single spacer. This allows for a considerable amount of latitude in locating the character beneath the magnetic reading head. As will be seen hereafter the circuit arrangement according to the invention is designed so that production of an output signal above a given level from any two adjacent magnetic cores causes a signal of one type to be produced and otherwise a signal of another type is produced.

In FIGURE 4, (a) represents a magnetic core made up of two portions $3a$, $3b$ with its associated output winding 4. It will be understood that the core 3 is in practice made up of a number of laminations and is only made in two portions $3a$ and $3b$ for the purposes of providing easy assembly of the head. The lower gap 5 is the normal reading head gap whereas the upper gap 6 is merely due to the core 3 being in two parts. FIGURE 4b shows an enlarged end view of two elements of a magnetic reading head and shows the way in which the output windings on successive elements are staggered thus allowing for closer packing. For reasons which will become apparent hereafter the outputs from adjacent reading elements are arranged to be of opposite phase.

For the purposes of the example of the invention being considered, namely where the head arrangement is such as to make it necessary only to detect the presence or otherwise of a signal having a predetermined level at two adjacent head elements to give a binary coded representation of the character being identified, the reading head is dimensioned for use with the above set of characters in accordance with the following criteria:

(a) $$S \not< 2(x+y)$$

when $S$ is the length of a *significant* mark in a strip—i.e. one which must be read and not ignored.

(b) $$p \not< (2x+y)$$

where $p$ is the distance along a strip of a character between separated portions thereof which are to be ignored.

(c) $$q \not> 0.5y$$

where $q$ is the distance along a strip occupied by a separated portion of a character which is not significant—i.e. is to be ignored.

In order to read characters in accordance with the invention which are printed side by side in magnetic ink for example on bankers cheques, the cheques are first subjected to magnetisation by passing at a virtually constant speed below a magnetic recording head to record an alternating signal the frequency of which is such as to cause a relatively large number of cycles to be recorded on each strip of the character which bears ink. The cheques are then passed through a transport mechanism, which may be of any suitable known form and will not be described herein, arranged to cause the characters to pass successively beneath the series of elements of the magnetic reading head 7 in FIGURE 5. The elements of the reading head are denoted as $7a$, $7b$, $7c$ . . . $7j$ in the diagram and associated with each of these heads there is a separate output channel. Each output channel is identical and for the purposes of the present description only the output channel relating to $7a$ will be described. The output from $7a$ is applied to the input of a head amplifier $8a$ which is preferably a conventional transistor amplifier such as is often used in conjunction with magnetic reading or replay devices. The amplifier output is applied to a further variable gain amplifier $10a$ and as will be appreciated hereafter there are provided between $8a$ and $10a$ for successive channels a series of impedances which are individually adjusted, to compensate at least in part for cross talk which may occur between the output channels for the respective reading elements. The output of $10a$ is applied to a peak rectifier $11a$ and via a further amplifier 12 to a double limiting circuit $13a$. As will be appreciated the double limiting circuit $13a$ is arranged in response to the window threshold level generator 14 to provide an output of predetermined amplitude only when the input level to 13 has attained a certain threshold value, this value being determined in relation to the signals appearing in all the channels. For this purpose a peak detector 15 is provided which is responsive to all the signal channels to determine which is providing the greatest signal, this signal being applied to 14. The circuits $13a$ to $13j$ and the threshold level generator 14 will be described in greater detail hereafter with reference to FIGURES 8 and 9. The outputs from the ten circuits $13a$ to $13j$ are applied to a series of nine "2" gates $16a$, $16b$ . . . $16i$ as indicated in the figure, the output from $13a$ being applied to one input of $16a$, the output of $13b$ being applied to the other input of $16a$ and the input of $16b$ and so on, the output of $13i$ being applied to one input of $16h$ and one input of $16i$ and the output of $13j$ being applied only to the other input of $16i$. The outputs of $16a$, $16b$ . . . $16i$ are applied to respective inputs of a "1" gate 17 which provides an output whenever an output is present in one at least of the preceding "2" gates.

In operation of FIGURE 5 characters are passed by means of the aforesaid transport mechanism beneath the reading head 7, ignoring any signal slicing which occurs if two adjacent elements of the reading head 7 pass over a strip of a character which causes output signals to be generated in both channels corresponding to the respective two adjacent heads, then by virtue of the arrangement of the two gates 16, the two gates which receives outputs from both the said channels produces an output channel which is supplied to 17. In any other circumstance, for example when the magnetic reading head elements $7b$ and the magnetic reading head elements $7d$ produce output signals, neither of the two gates $16a$, $16b$, $16c$ and $16d$ can produce an output signal so that no signal appears at the output of 17.

The transistor head amplifiers $8a$, $8b$ etc. are connected directly to the head coils of the respective pick-up head elements and serve to amplify the output signals of the respective head elements up to a convenient level for connection for cross talk between the adjacent head to be made. This connection is desirable because in practice signals may be induced in a head element winding from a part of a character corresponding to an adjacent element. Magnetic screening between adjacent head elements is usually impracticable moreover because of the fact that the adjacent elements are so close together. As aforementioned the outputs from the adjacent magnetic head elements $7a$ to $7j$ are arranged to be oppositely poled and this enables cancellation of cross-talk to be made by connecting impedances between successive channels, these impedances are represented by $9a$, $9b$, $9c$ . . . $9i$ in FIGURE 5. These comprise variable resistors which are adjusted when the magnetic head is installed to provide a minimum of cross-talk in the respective output channels from amplifiers 8a . . . 8j.

After cross talk correction the output signals are again amplified by amplifiers 10a, 10b . . . 10j which provide equal responses in each channel and the full wave rectifiers 11a, 11b . . . 11j convert the signals into negative half sinusoids. The signals are then passed via amplifiers 12a to 12j respectively to the aforesaid limiting circuits 13a to limit the signals. It will be appreciated that random signals may be produced in the respective signal channels and the limiting is provided to as far as possible remove these before the signals reach the respective gates 16a, 16b . . . 16j.

Referring to FIGURE 8, which shows the form of double limiting circuit employed for 13a to 13j, the negative half sinusoids shown at 47 are applied via the resistor 48 to the left hand grid of the valve 49, connected in long tail pair fashion with 49, the further valve 50 has its anode connected via a diode 52 to a positive supply rail and via a diode 51 to a more positive reference potential, and also via the normal anode resistor to a positive H.T. supply. The point at which the input waveform is sliced is determined by the potential applied to the grid 54 of 50. As mentioned earlier, this potential is determined by a threshold circuit 14 (FIGURE 5) which is illustrated in greater detail in FIGURE 9.

It will be appreciated that although a major proportion of cross-talk may be removed by providing suitable cancelling means between the adjacent sensing head elements, it is desirable to ascertain that by choice of the limiting level for the limiting circuits the remaining signals due to cross-talk between the signal channels shall be totally removed. The limiting level is in general determined as a portion of the maximum output signal level but it will be appreciated that since the output signal comprises a number of negative half cycles, cusps are present and the limiting level must therefore be held down between the waveform peaks to fill in the cusps and thus remove the possibility of a spurious signal breaking through in the region of the cusps. Since furthermore an inked area of a character tends to have greater amounts of magnetisation towards the centre of the area, it is desirable that the limiting level shall be arranged to follow as far as possible the desired signal level.

In consequence, of the above, the limiting level for the limiting circuits 13a to 13j is arranged by means of the circuit of FIGURE 1 to comprise basically a mixture of three components, one consisting of an attenuated version of the largest output signal, another consisting of a smoothed version of this signal and the third of a predetermined fixed limiting level.

Referring to FIGURE 9, reference 15 denotes the contents of block 15 of FIGURE 5. Thus it will be clear that the diodes 15 provide an output via resistor 55 to the control grid of valve 56. This input signal to 56 comprises the largest output signal appearing in the output channels from the sensing head elements. An output is derived from 55 via the junction of the cathode resistors 56 and 57 and applied to the cathode of diode valve 58. In the anode lead of 58 is a potentiometer comprising resistors 59 and 60, across 60 there is provided a condenser 61 which provides the necessary time constant to bring up the slicing level between peaks of the waveform as aforesaid. The cathode of 58 is connected to ground via a potential divider comprising resistors 62 and 63 the division ratio of which is substantially the same as for 59 and 60. Valves 64 and 65 comprise mixer valves and it will be clear from the above that 64 receives at its grid from the junction of 62 and 63 an attenuated version of the input waveform and 65 receives at its grid via the resistor 66, an attenuated and smoothed version of the input waveform. Valves 64 and 65 are provided with respective cathode potentiometers 67 and 68 and 69 and 70, junctions of which are connected via diodes 71 and 72 and variable potentiometer 73 to ground. The variable potentiometer 73 provides a selected fraction of the mixed inputs to 64 and 65 for application via resistor 74 to the left hand grid of the circuit comprising valves 75 and 76. These two valves have respective cathode potential dividers comprising resistors 77 and 78, 79 and 80, the junctions of which resistors are connected via diodes 81 and 82 to the output lead 83. An H.T. potential source also is connected via resistors to the opposite sides of diodes 81 and 82. The limiting level is set in known manner by means of a predetermined potential applied to the grid of 76. This is tapped from a subsidiary potentiometer via resistor 86a. As indicated earlier, the output slicing waveform in 83 is applied to the respective grids such as 54 of the valves 50 in the double limiting circuits one of which is shown in FIGURE 8.

Referring to FIGURE 6, the output of the gate 17 in FIGURE 5 is applied to the lead 18 which is connected to a start window 19 which comprises a limiting circuit which only passes signals of a predetermined level and over and also a threshold "3" gate 20. The output of 19 is applied to a "beginning" element 21 the output of which is applied as a setting input to the bistable element 22. The bistable element 22 has an output lead 23, which is connected as a resetting lead to the first two stages of a binary counter 24, 25, the final stage of the counter being identified as the element 26. The output of the element 22, corresponding to the "1" state of the bistable element 22, is applied as a single input to the "2" gate 27 which as will be appreciated hereafter receives a second input consisting of timing pulses at the input lead 28. The output of 27 is applied as a stepping input to the first stage 24 of the binary counter. The output of the second stage 25 of the counter corresponding to a change of 25 from the "0" state to the "1" state constitutes a further input to the "3" gate 20 and the output from the third stage 26 of the counter constitutes the third input for the gate 20. This latter output is also applied via a beginning element 29 as a resetting input to a stage 30 of a binary register. As will be appreciated this stage of the binary register constitutes in effect a single binary store and the remainder of the stages operate as a conventional shift register for signals representing "1's" or "0's" according to the interpretation of successive strips of a character.

The ouput of 20 is applied as a resetting input which when an output pulse occurs therein causes 30 to be set to the "1" state. The output of 26, corresponding to the "0" state of the binary counter stage 26, is applied via a beginning element as a shift input to the shift register 32 and also as one input to the "2" gate 33. The second input to this gate is derived via a beginning element 34 from the said output of 25, corresponding to the "1" state thereof and the output of 33 is applied as a resetting input to the bistable element 35. The output of 35 corresponding to the "1" state is applied to a gate as an inhibit input, moreover 35 receives a resetting input at the same time as 32 and 24 and 25 from the bistable element 22 via 23. The element 22 itself receives resetting inputs to set it to the "0" state from the "1" gate 36, which receives inputs from gate 36 and via the beginning element 38 from the final stage of 32 where it is set to the "1" state. The gate 36 further receives two more inputs, one from the element 21 and the other corresponding to the "1" state of 30. As will be appreciated hereafter the gate 36 operates as a double inhibit gate. In order to provide clock pulses in the lead 28, the drive mechanism for the above mentioned transport mechanism for documents to be read is coupled to a rotating disc 39. The drive to the disc is represented in FIGURE 6 by the motor 40. The disc 39 is provided with a plurality of holes around the circumference, arranged to cause the light from a source via a lens system 42 to fall intermittently on a photo cell 43. The photo-cell 43 is connected via an amplifier 44 and a clock pulse limiter 45 to the pulse shaper 45a. The lead 28 is connected to the pulse shaper 45a and it will be appreciated hereafter that the arrangement and the number of holes in 39 is such as to produce two clock pulses for the passage of each hole in 39 past the light source. This enables the disc 39 to be of reasonable small size, that is about six or eight inches in diameter. Eight clock pulses are produced for the passage of one of the said strips of a character beneath the reading heads 7a to 7j. Outputs of the first five stages of the shift register 32 are applied to a decoding matrix, the form of which will be understood from FIGURE 10.

In order that the operation of FIGURES 5 and 6 together will be readily understood and to avoid confusion which may be caused by entering into circuit details, the operation of the arrangement will be described in terms of the logical elements used and with the aid of the graphical representation shown in FIGURE 7. FIGURE 7 shows graphical representations of the various states of the components of the present embodiment of the invention when used for the purposes of identifying the character "5," the coding for which as shown in the above given list is 11101.

Referring to the logical elements used, the various gates shown as circles in FIGURES 5 and 6 with an enclosed number representing the thresholds thereof are all signal gates of form known to persons skilled in the art. However suitable forms of gate are described in the "Proceedings of the I.R.E.," May 1950, page 511. An inhibit gate such as 36 may be of similar construction to the above-mentioned gates except that one of the inputs is reversed. A threshold "three" gate can be realised by means of two threshold "two" gates. Beginning elements as used in the present circuit arrangement and indicated by "B" comprised simple differentiating circuits to give a beginning of signal indication.

Clock pulses generated by the rotating disc 39 are shown in FIGURE 7(c) and it will be assumed that the character (5) is beginning to pass beneath the reading head elements 7a to 7i. Since the first strip of a "5" as for all other characters represents a "1," a signal representing "1" is produced at the output of 17 (FIGURE 5) and this is applied to the start window 19 (FIGURE 6), the beginning element 21 therefor produces a pulse which sets the bistable element 22 to its "1" state. The state of 22 is shown in FIGURE 7(b). Thus gate 27 is enabled to produce an output pulse at each succeeding clock pulse until 22 is reset. These pulses are applied to the counter comprising 24, 25 and 26.

Moreover in the reset condition, this counter is in a state for which 24 and 25 are in their "1" states and 26 is in its "0" state. This is for the purpose of providing sampling of each strip of a character whilst the second quarter of the strip is being traversed. Thus when the serial clock pulse to 24, 25 is set to its "1" state in response to 24 being set back to its "0" state and an output appears at the beginning element 34 and at one input of 20. Since moreover 26 is already in its "1" state, this being the reset state of this element, 20 can pass a first signal derived from 18 and this first signal which always represents a "1" corresponding to commencement of a character, is applied to the storage element 30 to set it to its "1" state. The successive states of 24, 25 and 26 are shown at FIGURE 7, (d), (e) and (f) respectively and the sampling pulses are shown at (h). The purpose of the sampling store 30 is to store any black detected during the sampling pulses (h) until the arrival of the shift pulse (k) and the successive states of this store are shown in FIGURE 7i. The counter element 26 provides via the element 31 a shift pulse for the shifting register to shift successive signals along the register. Thus in the present example the shift pulse is produced when the counter responds to the fourth clock pulse and in the presence of a character, thus always puts a "1" into the first stage of the register. The counter then continues to count clock pulses and as the eighth clock pulse is counted, the first "strip" of the character passes from beneath the magnetic sensing head 7 and the next strip is examined in a similar manner. It may be noted that only one shift pulse is produced for each cycle of the counter since only at one time in a cycle is 26 in its "1" state when 25 makes a transition from the "1" state to the "0" state. The successive shift pulses cause the digit pattern representing whether for each successive strip of a character two adjacent "black" signals occur, to pass along the register 32. For the character 5 all the shift pulses except the fourth shift in "1's" and the fourth shifts in a "0." When the first digit "1" is transferred to the fifth stage of the register, a way through the decoding matrix 46 is opened and the figure "5" is identified. The manner of producing this way through 46 is shown in FIGURE 10, and an output from 46 will appear at the time shown in FIGURE 7(n).

The sixth shift pulse for each character causes the "1" held in the fifth stage of the register to be transferred to the final stage. When this occurs, a reset pulse (FIGURE 7m) is produced via the beginning element 38 and the "1" gate 37, which resets the bistable element 22 to its "0" state (FIGURE 7b). Resetting 22 to its "0" state prevents further clock pulses from reaching 24 and causes 24, 25 and 26 to be reset to "0," "0" and "1" states respectively, resets the first five stages of the register 32 and also causes 35 to be reset to its "0" state. Resetting of the counter stage 26, furthermore produces via "beginning" element 29 a reset pulse (FIGURE 7j) which resets the sampling store 30 to its "0" state in readiness for the next operation. Clearly by this means, 30 is also reset after each shift pulse; this is only strictly necessary when 30 has held a "1" but in practice there is no purpose in discriminating between the states of 30 so a reset pulse is produced for 30 after each shift pulse whatever is stored therein.

It will be appreciated that although as described above precautions are taken to avoid the occurrence of spurious signals in the lead 18 nevertheless spurious signals may on occasion be produced in 18 which can initiate a false start of a reading procedure of the apparatus of FIGURE 6, by triggering the bistable element 22 into its "1" state. Assuming therefore that such a spurious signal does occur, 22 is triggered and clock pulses are therefore transmitted to the counter element 24. However at a first sampling pulse, no ink is detected since no character is present so that a "0" is shifted into 30. It will be appreciated that this cannot occur if a character is present because every character produces a "1" at the first sampling. The first shift pulse is also fed to the gate 36 which passes the pulse to 37 only when there is no output from 30 and this causes the counters to be reset as before and the flow of clock pulses is inhibited so that no spurious signals are shifted into the shift register 32.

The bistable element 35 has been mentioned above but without explanation of the purpose of its existence. It will be appreciated that since the gate 20 is connected to transmit a pulse when 25 is in its "1" state and 26 changes to its "0" state, the element 35 is triggered later than the occurrence of the first shift pulse for each character, as shown in FIGURE 7(l), in fact the triggering occurs at three quarters of the way across the first strip. If after the first strip has been traversed therefore a shift pulse occurs, as in the case of the fourth shift pulse for a character "5," at a point where there is a blank strip, this would in the absence of 35 cause a reset pulse to operate as if a false start was occurring but by virtue of 35 being set to the "1" state, 36 is inhibited and the reset pulse does not occur.

Referring to FIGURE 10, the decoding matrix 46 is of conventional form and need not be described in greater detail. References 86 to 90 represent the driving circuits for the matrix and each comprises a pair of triodes operating cathode followers responding to the respective states of the first five stages of the shift register 32. The horizontal output leads of the matrix 91, 92, 93 ... 102, are shown as joined to circles containing the character to which each corresponds. The vertical lines of the matrix are connected via diodes with shunt resistors (as shown at 103) selectively to the output leads in the manner indicated by the small circles 104, to provide the desired decoding. The output potentials appearing at the respective output leads 91, 92, 93 ... 102 can be employed in any specified known manner, for example to operate a sorting mechanism or an electric typewriter. However the manner of utilising these output signals is immaterial to the present invention.

Although the present invention has been described with reference to a character reading apparatus for reading characters printed with magnetic ink, clearly the invention may be applied to character reading apparatus for reading characters by sensing in any other manner, for example by optical means.

What I claim is:

1. Apparatus for reading printed characters comprising means for analysing a character to produce a plurality of groups of discrete signals characteristic of the character, the number of kinds of said discrete signals being less than the number of said signals, means for producing for each group of said first discrete signals a further discrete signal of one kind if one particular criterion is satisfied by the respective group of first discrete signals and a further signal of another kind if that criterion is not so satisfied, and means responsive to the combination of said further discrete signals for identifying the character.

2. Apparatus for reading printed characters, comprising means for analysing a character to produce a plurality of discrete signals characteristic of the character, the number of kinds of said discrete signals being less than the number of said signals, said analysis means including means for grouping said discrete signals in a plurality of groups, the discrete signals of each group being equal in number and said number being less than the total number of discrete signals which are characteristic of the character, a logical circuit having a plurality of input terminals equal in number to the number of discrete signals in each group and having an output terminal, and having logical means coupling said input terminals and said output terminal to cause an output signal of one kind to appear at said output terminal in response to input signals applied to said input terminals which satisfy one particular criterion and to cause an output signal of another kind to appear at said output terminal in response to input signals applied to said input terminals which do not satisfy said criterion, means for applying said groups of discrete signals successively to the input terminals of said logical circuit to produce a series of output signals of said one or other kind at said output terminal, and means responsive to the series of output signals at said output terminal to identify the character.

3. Apparatus according to claim 1, said analysing means comprising means for causing a sensing means to scan across a character from one edge to another to produce said first mentioned discrete signals, and comprising means for storing said further discrete signals, means synchronized with said analysing means for applying said further discrete signals to said storage means.

4. Apparatus according to claim 3, said storage means comprising a shift register, means being provided synchronised with said analysing means to provide respective shift pulses for said shift register after the producton of each respective group of said first mentioned discrete signals has been effected by said sensing means, means responsive to the shift pulse corresponding to the final group of said first mentioned discrete signals for applying said further discrete signals to said identifying means.

5. Apparatus according to claim 4, said means synchronized with said analysing means comprising a counter arranged to operate in response to pulses produced in timed relationship with said analysing means, a plurality of pulses being produced during the analysis of each group of said first mentioned discrete signals, said analysis of each group and the production of said shift pulses occurring in response to respective predetermined changes in the state of said counter.

6. Apparatus according to claim 5, said analysing means comprising a plurality of sensing elements for sensing the presence of printing material on portions of a strip of a character, and means for producing a said further discrete signal of one kind only when two sensing elements produce outputs corresponding to like adjacent portions of said strip.

7. Apparatus according to claim 6, said means for producing a further discrete signal of one kind only when two detecting devices produce outputs corresponding to like adjacent portions comprising a plurality of threshold "2" gates one less in number than said sensing element and each except the first and last arranged to receive at each input, output signals from adjacent sensing devices, the first and the last of said gates receiving at one input only respective output signals from the first and last sensing devices respectively.

8. Apparatus according to claim 7, said sensing means comprising a magnetic sensing head subdivided into a plurality of elements greater in number than the number of said first mentioned discrete signals, whereby a substantial degree of misregistration of said head with the character may be tolerated.

9. Apparatus according to claim 8, said storage means being preceded by a sample store means responsive to the signal stored in said sample store for detecting whether said head elements are detecting a character and means responsive to said detecting means for resetting said counter in the event of a character not being detected.

10. Apparatus according to claim 9, comprising respective means for limiting the output waveforms from the respective sensing head elements to eliminate undesired relatively low amplitude signals therein.

11. Apparatus according to claim 10, comprising means for generating a limiting level signal for said respective limiting means, comprising a mixture of an attenuated version of the maximum output signal from said head elements and an attenuated and smoothed version of the output signal from said head elements.

References Cited by the Examiner

UNITED STATES PATENTS

| | | | |
|---|---|---|---|
| 2,616,983 | 11/52 | Zworykin | 340—149.1 |
| 2,932,006 | 4/60 | Glauberman | 340—149.1 |

FOREIGN PATENTS

| | | |
|---|---|---|
| 1,146,002 | 11/57 | France. |

OTHER REFERENCES

A Reading Machine for Business Purposes, British Communications and Electronics, vol. 6, No. 3, Mar. 19, 1959, page 185.

MALCOLM A. MORRISON, *Primary Examiner.*

IRVING L. SRAGOW, NEIL C. READ, *Examiners.*